United States Patent
Xie et al.

(10) Patent No.: US 11,977,229 B2
(45) Date of Patent: May 7, 2024

(54) MULTI-FOCAL PLANE DISPLAY SYSTEM AND DEVICE

(71) Applicant: HUAWEI TECHNOLOGIES CO., LTD., Guangdong (CN)

(72) Inventors: Zhenlin Xie, Dongguan (CN); Qi Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 615 days.

(21) Appl. No.: 17/166,358

(22) Filed: Feb. 3, 2021

(65) Prior Publication Data
US 2021/0157151 A1 May 27, 2021

Related U.S. Application Data

(63) Continuation of application No. PCT/CN2019/129243, filed on Dec. 27, 2019.

(30) Foreign Application Priority Data

Dec. 29, 2018 (CN) .......................... 201811647406.3

(51) Int. Cl.
*G02B 27/01* (2006.01)
*G02B 27/00* (2006.01)
*H04N 9/31* (2006.01)

(52) U.S. Cl.
CPC ..... *G02B 27/0172* (2013.01); *G02B 27/0093* (2013.01); *H04N 9/3161* (2013.01);
(Continued)

(58) Field of Classification Search
CPC ............ G02B 27/0172; G02B 27/0093; G02B 30/52; G02B 26/101; G02B 2027/0174;
(Continued)

(56) References Cited

U.S. PATENT DOCUMENTS 10,088,685 B1 * 10/2018 Aharoni ............... G02B 6/0076
2008/0117289 A1   5/2008 Schowengerdt et al.
(Continued)

FOREIGN PATENT DOCUMENTS

CN       104954777 A      9/2015
CN       106353885 A      1/2017
(Continued)

OTHER PUBLICATIONS

Magarinos J R et al: "Holographic Mirrors", Optical Engineering, Soc. of Photo-Optical Instrumentation Engineers, Bellingham, vol. 24, No. 5, 1985, 12 pages.

*Primary Examiner* — Mustak Choudhury
(74) *Attorney, Agent, or Firm* — WOMBLE BOND DICKINSON (US) LLP

(57) ABSTRACT

A multi-focal plane display system and a device are provided. The multi-focal plane display system includes a laser projection optical engine and a holographic reflection light fusion device. The laser projection optical engine is configured to generate and modulate at least two laser beam groups, and transmit the at least two laser beam groups to the holographic reflective optical fusion device, where each laser beam group corresponds to one displayed image. The holographic reflective optical fusion device is configured to reflect the at least two laser beam groups, where exit pupil locations of the at least two laser beam groups are the same, and displayed images of at least two focal planes are obtained by performing imaging on the at least two laser beam groups by a human eye. A structure of the multi-focus plane display system provided in the embodiments is easy to implement.

20 Claims, 9 Drawing Sheets

(52) U.S. Cl.
CPC ... *H04N 9/3164* (2013.01); *G02B 2027/0174* (2013.01); *G02B 2027/0178* (2013.01)

(58) Field of Classification Search
CPC .... G02B 2027/0178; G02B 2027/0185; H04N 9/3161; H04N 9/3164
See application file for complete search history.

(56) References Cited

U.S. PATENT DOCUMENTS

| | | | |
|---|---|---|---|
| 2011/0157667 A1* | 6/2011 | Lacoste | G03H 1/0808 359/9 |
| 2016/0147067 A1* | 5/2016 | Hua | G02B 27/017 345/419 |
| 2016/0147081 A1 | 5/2016 | Kilcher et al. | |
| 2018/0267316 A1 | 9/2018 | Noguchi et al. | |

FOREIGN PATENT DOCUMENTS

| | | | | |
|---|---|---|---|---|
| CN | 107003734 A | 8/2017 | | |
| CN | 107407812 A | 11/2017 | | |
| CN | 107894666 A | 4/2018 | | |
| CN | 109073819 A | 12/2018 | | |
| CN | 109633905 A | 4/2019 | | |
| IN | 108351519 A | 7/2018 | | |
| JP | H068906 A | 1/1994 | | |
| JP | 2005500578 A | * | 1/2005 | ............. G02B 30/52 |
| JP | 2006017991 A | 1/2006 | | |
| JP | 2008509438 A | 3/2008 | | |
| JP | 2017536570 A | 12/2017 | | |
| JP | 2018518709 A | 7/2018 | | |
| WO | 2018034131 A1 | 2/2018 | | |
| WO | 2018190007 A1 | 10/2018 | | |

* cited by examiner

MULTI-FOCAL PLANE DISPLAY SYSTEM AND DEVICE

CROSS-REFERENCE TO RELATED APPLICATIONS

This application is a continuation of International Application No. PCT/CN2019/129243, filed on Dec. 27, 2019, which claims priority to Chinese Patent Application No. 201811647406.3, filed on Dec. 29, 2018. The disclosures of the aforementioned applications are hereby incorporated by reference in their entireties.

TECHNICAL FIELD

Embodiments of this application relate to the field of display technologies, and in particular, to a multi-focal plane display system and device.

BACKGROUND

Augmented reality (AR) is a technology for augmenting a user's perception for a real world by using information provided by a computer system. In the technology, virtual information is applied to the real world, and a virtual object or scenario generated by a computer is superposed onto a real scenario, to implement augmented reality. Virtual reality (VR) generates a virtual world by using information provided by a computer system, for example, a virtual object or scenario may be presented.

Currently, a vergence-accommodation conflict is a biggest technical problem of AR and VR, and severely affects user experience. The vergence-accommodation conflict is a conflict in which distance information, about an observed target, that is reflected by human eye vergence is inconsistent with that reflected by crystalline lens accommodation. The human eye vergence indicates a degree of eyeball vergence when a person observes a target with both eyes. The crystalline lens accommodation means focusing through crystalline lens accommodation when a person observes a target with an eye, to ensure that a retina receives a clear image. An existing augmented reality device displays, to left and right eyes, images of a same object that are shot at different angles, and presents a stereoscopic feeling by using an offset of the images seen by both eyes. However, these images do not have depth information, and therefore focus adjustment of the eyes does not match a sense of depth, but human eye vergence still truly reflects distance information of a virtual target, thereby resulting in a vergence-accommodation conflict. To address the vergence-accommodation conflict, the prior art proposes use of a plurality of focal planes to provide depth information closer to a natural light field, so as to alleviate the vergence-accommodation conflict. For example, in a multi-focal plane display system, two liquid crystal projectors and two diffractive optical waveguides are disposed for each eye. For each liquid crystal projector and each diffractive optical waveguide, an image generated by the liquid crystal projector is coupled to the diffractive optical waveguide through a relay optical path. After undergoing pupil amplification processing by the diffractive optical waveguide, an image exits a pupil and enters a human eye, to generate a focal plane. Therefore, the two liquid crystal projectors and the two diffractive optical waveguides can generate two focal planes.

However, the existing multi-focal plane display system has disadvantages such as a complex structure, and is inconvenient for manufacturing an augmented reality or virtual reality device.

SUMMARY

Embodiments of this application provide a multi-focal plane display system and device with a simple structure, to facilitate manufacturing of an augmented reality device and a virtual reality device.

According to a first aspect, an embodiment of this application provides a multi-focal plane display system, including a laser projection optical engine and a holographic reflective optical fusion device, where the laser projection optical engine is configured to generate and modulate at least two laser beam groups, and transmit the at least two laser beam groups to the holographic reflective optical fusion device, where each laser beam group corresponds to one displayed image; and the holographic reflective optical fusion device is disposed on an emergent optical path of the laser projection optical engine, and is configured to reflect the at least two laser beam groups, where exit pupil locations of the at least two laser beam groups are the same, and displayed images of at least two focal planes are obtained by performing imaging on the at least two laser beam groups by a human eye. A user can simultaneously view two displayed images at different depths, to avoid or alleviate dizziness and discomfort that are caused by a vergence-accommodation conflict during usage of the user. Multi-focal plane display can be implemented for a single eye of the user by using one laser projection optical engine and one holographic reflective optical fusion device. A structure is simple, thereby facilitating manufacturing and compactness of an augmented reality device or a virtual reality device.

In an embodiment, the laser projection optical engine includes:

a laser generator, configured to generate the at least two laser beam groups, where a preset wavelength difference exists between a $j^{th}$ laser beam in an $i^{th}$ laser beam group and a $j^{th}$ laser beam in a $k^{th}$ laser beam group, and i, j, and k are integers greater than or equal to 1; and a scanning modulator, disposed on an emergent optical path of the laser generator, and configured to modulate the at least two laser beam groups, so that laser beams in the laser beam groups are emitted to the holographic reflective optical fusion device at different deflection angles.

In an embodiment, the preset wavelength difference is set to exist between the $j^{th}$ laser beam in the $i^{th}$ laser beam group and the $j^{th}$ laser beam in the $k^{th}$ laser beam group, so that multi-focal plane display can be implemented by using a wavelength selection characteristic of the holographic reflective optical fusion device. The preset wavelength difference may be determined based on color sensitivity of the user's eyes, and the user's eyes cannot distinguish between different colors corresponding to laser beams with the preset wavelength difference. The holographic reflective optical fusion device has advantages such as a small size, light weight, and low costs, so that the entire multi-focal plane display system is small in size and light in weight, and is easy to manufacture.

In an embodiment, a divergence angle of the $j^{th}$ laser beam in the $i^{th}$ laser beam group is equal to that of the $j^{th}$ laser beam in the $k^{th}$ laser beam group, and a quantity of laser beams in the $i^{th}$ laser beam group is less than or equal to a quantity of laser beams in the $k^{th}$ laser beam group.

The divergence angle of the $j^{th}$ laser beam in the $i^{th}$ laser beam group is set to be equal to that of the $j^{th}$ laser beam in the $k^{th}$ laser beam group, so that impact of different divergence angles on focal planes is avoided, and a plurality of focal planes can be accurately obtained.

In an embodiment, the holographic reflective optical fusion device includes at least two holographic function layers, each holographic function layer is configured to reflect one of the at least two laser beam groups, and different holographic function layers reflect different laser beam groups. The holographic function layer includes at least one holographic microstructure, and each holographic microstructure may reflect a laser beam with one wavelength. A plurality of focal planes can be displayed by using a wavelength selection characteristic of the holographic function layers. The holographic reflective optical fusion device includes the at least two holographic function layers. The holographic function layers are internal structures of the holographic reflective optical fusion device, and do not increase a volume of the holographic reflective optical fusion device, thereby retaining the characteristics of a small size and light weight of the holographic reflective optical fusion device.

In an embodiment, the laser beam group includes at least one laser beam, and wavelengths of all laser beams included in any laser beam group are different from wavelengths of laser beams included in another laser beam group.

In an embodiment, a wavelength difference between every two laser beams of all the laser beams is greater than a sensitive wavelength difference of the holographic reflective optical fusion device. The sensitive wavelength difference indicates a fluctuation range of a wavelength that can be reflected by the holographic microstructure. A wavelength difference between every two laser beams is greater than the sensitive wavelength difference, to avoid a problem that laser beams of different wavelengths are reflected by a same holographic function layer and a plurality of focal planes cannot be implemented.

In an embodiment, the laser generator includes at least one laser chip, each laser chip is configured to generate laser beams of different wavelengths in a time division manner, and the at least one laser chip is configured to generate the at least two laser beam groups in a time division manner, where the laser beam groups include laser beams generated by all the laser chips at a same moment.

The laser chip may be a tunable laser chip, and the tunable laser chip generates laser beams of at least two wavelengths through time division tuning. Two laser chips generate laser beams of different wavelengths in a time division manner, thereby reducing a quantity of laser chips, reducing costs, and facilitating miniaturization of the multi-focal plane display system.

In a possible design, the laser generator includes at least two laser chipsets, each laser chipset includes at least one laser chip, the laser chip is configured to generate a laser beam with one wavelength, and the laser chipset is configured to generate a laser beam group. That each laser chip generates a laser beam with one wavelength can be implemented by using a laser chip with a simple structure, thereby facilitating large-scale manufacturing of the multi-focal plane display system.

In an embodiment, the laser projection optical engine includes:

a laser generator, configured to generate the at least two laser beam groups; and a scanning modulator, configured to modulate the at least two laser beam groups, so that laser beams in the laser beam groups are emitted to the holographic reflective optical fusion device at different deflection angles, where a wavelength of a $j^{th}$ laser beam in an $i^{th}$ laser beam group is the same as that of a $j^{th}$ laser beam in a $k^{th}$ laser beam group, wavelengths of laser beams in the laser beam group are different from each other, divergence angles of all laser beams with a same wavelength are different, focal planes of displayed images obtained after the laser beams with a same wavelength but different divergence angles are reflected by the holographic reflective optical fusion device and undergo imaging by a human eye are different, and i, j, and k are integers greater than or equal to 1.

The focal planes of the displayed images obtained after the laser beams with a same wavelength but different divergence angles are reflected by the holographic reflective optical fusion device and undergo imaging by the human eye are different, and the laser beams with a same wavelength but different divergence angles may be displayed on different focal planes by using the holographic reflective optical fusion device, thereby implementing multi-focal plane display. The holographic reflective optical fusion device has advantages such as a small size, light weight, and low costs, so that the entire multi-focal plane display system is small in size and light in weight, and is easy to manufacture.

In an embodiment, a quantity of laser beams in the $i^{th}$ laser beam group is less than or equal to a quantity of laser beams in the $k^{th}$ laser beam group.

In an embodiment, the laser generator includes:

at least two laser chipsets, and a beam shaping component that is in a one-to-one correspondence with each laser chip in the laser chipsets, where the laser chipset includes at least one laser chip, the laser chip is configured to generate a laser beam with one wavelength, the laser chipset is configured to generate a laser beam group, and a wavelength of a $j^{th}$ laser beam in the $i^{th}$ laser beam group is the same as a wavelength of a $j^{th}$ laser beam in the $k^{th}$ laser beam group; and the beam shaping component is configured to shape a laser beam generated by the laser chip, so that divergence angles of all laser beams with a same wavelength are different.

The beam shaping component shapes the laser beams with a same wavelength, so that the divergence angles of all the laser beams with a same wavelength are different. The beam shaping component may be a liquid lens, a reflector array, a zoom lens group, or the like. That is, a simple optical component can make the divergence angles of all the laser beams with a same wavelength different. The beam shaping component is easy to produce in a large scale with low costs, so that a structure of the multi-focal plane display system is simple and easy to implement.

In an embodiment, the laser generator includes:

at least one laser chip, where the laser chip is configured to generate a laser beam; and a zoom beam shaping component that is in a one-to-one correspondence with each laser chip, configured to shape, in a time division manner, a laser beam generated by a laser chip corresponding to the zoom beam shaping component into laser beams with at least two divergence angles, where the laser beam group includes laser beams shaped by the zoom beam shaping component at a same moment.

The zoom beam shaping component shapes, in the time division manner, the laser beam generated by the laser chip corresponding to the zoom beam shaping component into the laser beams with the at least two divergence angles, thereby reducing a quantity of laser chips, and reducing costs of the multi-focal plane display system.

In an embodiment, the laser projection optical engine includes:

a laser generator, where the laser generator includes at least one laser chip, and the at least one laser chip is configured to generate at least one laser beam;

a scanning modulator, configured to modulate the at least one laser beam, so that the at least one laser beam is emitted to the holographic reflective optical fusion device at different deflection angles; and a zoom relay optical component, configured to shape, in a time division manner, a same laser beam processed by the scanning modulator into laser beams with at least two divergence angles, and transmit the laser beams with the at least two divergence angles to the holographic reflective optical fusion device, where the laser beam group includes a laser beam shaped by the zoom relay optical component at a same moment; and focal planes of displayed images obtained after laser beams with a same wavelength but different divergence angles are reflected by the holographic reflective optical fusion device and undergo imaging by a human eye are different.

The zoom relay optical component shapes, in the time division manner, the same laser beam processed by the scanning modulator into the laser beams with the at least two divergence angles. An effect of time division shaping on a plurality of laser beams is implemented by using a single optical component, so that a structure of the multi-focal plane display system is simple and easy to implement.

In an embodiment, the following is further included:

a display controller, configured to send configuration information to the laser projection optical engine, where the configuration information is information used by the laser projection optical engine to modulate at least two displayed images.

In an embodiment, the following is further included:

an eyeball tracking device, configured to determine a gaze direction of the user, where the display controller is specifically configured to generate the configuration information based on the gaze direction, and send the configuration information to the laser projection optical engine, where the configuration information is specifically information used by the laser projection optical engine to modulate the at least two displayed images, and a focus of each displayed image matches the gaze direction.

The configuration information used by the laser projection optical engine to modulate the at least two displayed images is generated based on the gaze direction of the user, so that images of a plurality of focal planes can be located in the gaze direction of the user, thereby avoiding deviating from the gaze direction of the user, and improving user experience.

In an embodiment, the scanning modulator is a reflective scanning oscillator or an actuator.

According to a second aspect, an embodiment of this application provides an augmented reality device, where the augmented reality device includes a carrier and the system according to the first aspect or the possible designs of the first aspect, and the system is disposed on the carrier.

In an embodiment, the augmented reality device is augmented reality glasses;

the carrier includes a lens frame and a lens;

the laser projection optical engine is disposed in the lens frame; and the holographic reflective optical fusion device is disposed on the lens.

According to a third aspect, an embodiment of this application provides a virtual reality device, where the virtual reality device includes a carrier and the system according to the first aspect or the possible designs of the first aspect, and the system is disposed on the carrier.

In an embodiment, the virtual reality device is virtual reality glasses;

the carrier includes a lens frame and a lens;

the laser projection optical engine is disposed in the lens frame; and the holographic reflective optical fusion device is disposed on the lens.

In the multi-focal plane display system provided in the embodiments of this application, the laser projection optical engine generates and modulates the at least two laser beam groups, and transmits the at least two laser beam groups to the holographic reflective optical fusion device, where each laser beam group corresponds to one displayed image; and the holographic reflective optical fusion device reflects the at least two laser beam groups, where the exit pupil locations of the at least two laser beam groups are the same, so that the displayed images of the at least two focal planes are obtained by performing imaging on the at least two laser beam groups by the human eye. With the laser projection optical engine and the holographic reflective optical fusion device, a simplified architecture of the multi-focal plane display system is implemented, thereby facilitating manufacturing of AR and VR devices.

In the embodiments of this application, the simplified multi-focal plane display system is used to manufacture augmented reality glasses, the holographic reflective optical fusion device is disposed on a lens so that a structure of the lens is simple and the lens is light, and the laser projection optical engine is disposed in a lens frame. Because structures of the holographic reflective optical fusion device and the laser projection optical engine are light and compact, the lens frame is also characterized by a simple structure and light weight, so that the augmented reality glasses are similar to glasses worn by a user daily, thereby improving user experience.

In the embodiments of this application, the simplified multi-focal plane display system is used to manufacture virtual reality glasses, the holographic reflective optical fusion device is disposed on a lens and a light shield layer is disposed on the lens so that a structure of the lens is simple and the lens is light, and the laser projection optical engine is disposed in a lens frame. Because structures of the holographic reflective optical fusion device and the laser projection optical engine are light and compact, the lens frame is also characterized by a simple structure and light weight, so that the virtual reality glasses are similar to glasses worn by a user daily, thereby improving user experience.

DESCRIPTION OF EMBODIMENTS

The system architecture and the application scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the system architecture and the emergence of new application scenarios, the technical solutions provided in the embodiments of this application are also applicable to similar technical problems.

Figure 1:
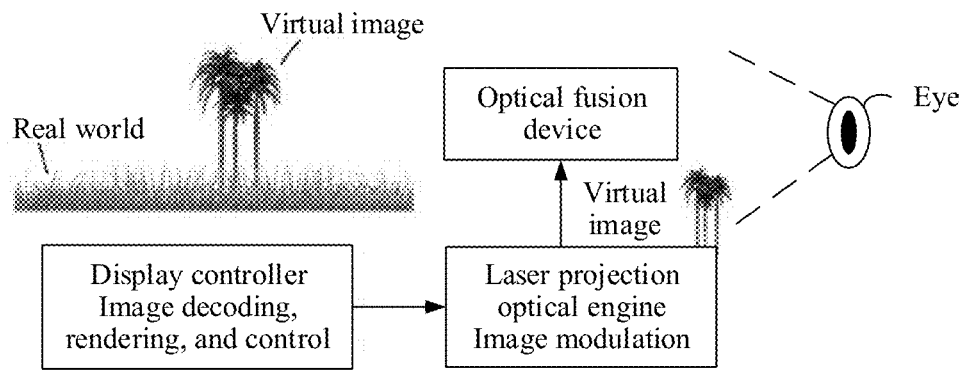
FIG. 1 is a schematic architectural diagram of a multi-focal plane display system according to an embodiment of this application.

FIG. 1 is a schematic architectural diagram of a multi-focal plane display system according to an embodiment of this application. The multi-focal plane display system may be applied to the augmented reality (AR) and virtual reality (VR) fields. For example, the multi-focal plane display system may be applied to a device such as AR glasses, an AR helmet, VR glasses, or a VR helmet. A device to which the multi-focal plane display system is applied is not particularly limited in the embodiments of this application. As shown in FIG. 1, a display controller performs operations such as image decoding, rendering, and control on a virtual image, and then transmits configuration information of the virtual image to an optical engine. The optical engine modulates the image into a laser beam, and then the laser beam is reflected by an optical fusion device. A user places an eye in an exit pupil range provided by the optical fusion device, and the eye of the user may receive a virtual displayed image reflected by the optical fusion device.

Figure 2:
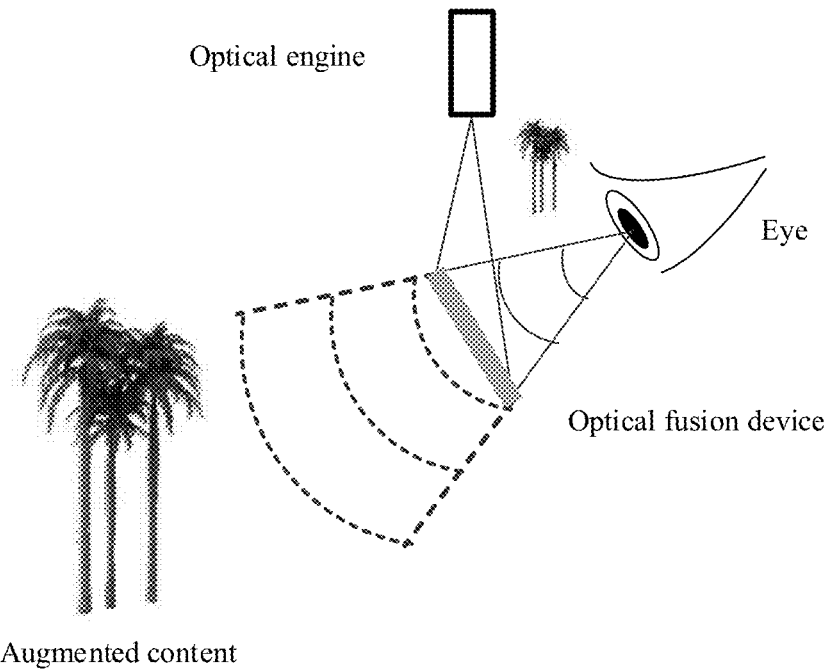
FIG. 2 is a schematic diagram of an application scenario of a multi-focal plane display system according to an embodiment of this application.

FIG. 2 is a schematic diagram of an application scenario of a multi-focal plane display system according to an embodiment of this application. As shown in FIG. 2, an optical engine provides a displayed image for each eye. A function of an optical fusion device is to reflect a displayed image projected by the optical engine, and provide a specific optical capability, so that exit pupil locations of all beams are the same, and the image projected by the optical engine is reflected to a user's eye in a form of a virtual image. As shown in FIG. 2, a beam emitted by the optical engine may provide an image of a tree. The optical fusion device is disposed on a light-emitting optical path of the optical engine, and transmits the image of the tree to the user's eye, so that the user can see a virtual tree.

To resolve a technical problem that an existing multi-focal plane display system has a complex structure and is inconvenient for manufacturing a VR device and an AR device, an embodiment of this application provides a multi-focal plane display system with a simplified architecture. The system is implemented based on a laser projection optical engine and a holographic reflective optical fusion device. The following provides detailed descriptions with reference to specific embodiments.

Figure 3:
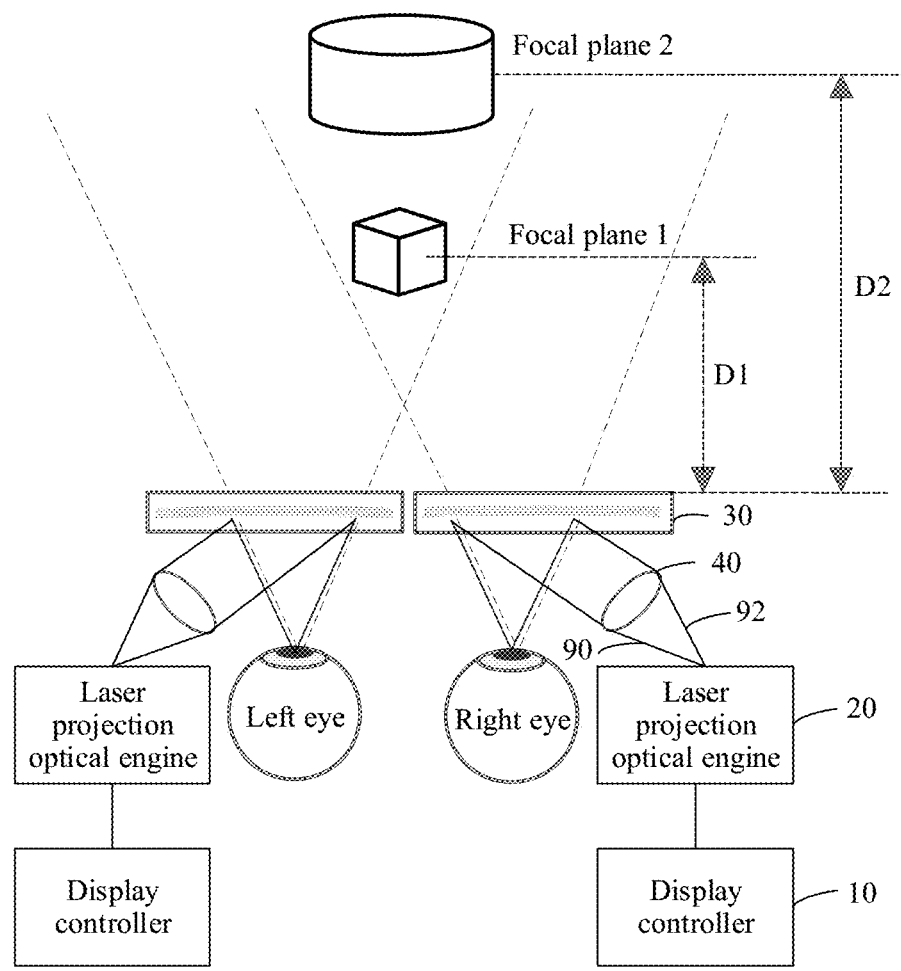
FIG. 3 is a schematic structural diagram 1 of a multi-focal plane display system according to an embodiment of this application.

FIG. 3 is a schematic structural diagram 1 of a multi-focal plane display system according to an embodiment of this application. As shown in FIG. 3, the multi-focal plane display system includes a laser projection optical engine 20 and a holographic reflective optical fusion device 30.

The laser projection optical engine 20 is configured to generate and modulate at least two laser beam groups 90 and 92, and transmit the at least two laser beam groups to the holographic reflective optical fusion device 30, where each laser beam group corresponds to one displayed image.

The holographic reflective optical fusion device 30 is configured to reflect the at least two laser beam groups, where exit pupil locations of the at least two laser beam groups are the same, and displayed images of at least two focal planes are obtained by performing imaging on the at least two laser beam groups by a human eye. The laser projection optical engine 20 may generate and modulate the at least two laser beam groups, and transmit the at least two laser beam groups to the holographic reflective optical fusion device 30. One laser beam group includes a plurality of laser beams, and corresponds to a displayed image of one focal length. Therefore, the at least two laser beam groups correspond to displayed images of at least two focal lengths.

In an embodiment, the laser projection optical engine 20 may include: a laser generator, configured to generate the at least two laser beam groups; and a scanning modulator, configured to modulate the at least two laser beam groups, so that laser beams in the laser beam groups are emitted to the holographic reflective optical fusion device at different deflection angles. A deflection angle is determined based on a location of a pixel in a virtual image, and a laser beam may generate the pixel at the location after deflection.

Figure 4:
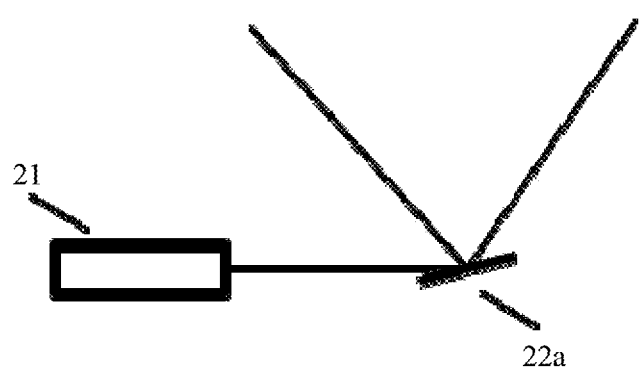
FIG. 4 is a schematic structural diagram 1 of a scanning modulator according to an embodiment of this application.
Figure 5:
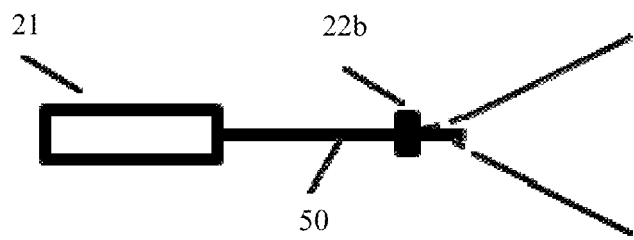
FIG. 5 is a schematic structural diagram 2 of a scanning modulator according to an embodiment of this application.

In an embodiment, the laser projection optical engine 20 is a laser MEMS scanning optical engine formed by using a laser as a light source and using a micro-electro-mechanical system (MEMS) as a scanning modulator. As shown in FIG. 4, the MEMS scanning modulator may be an MEMS reflective scanning oscillator 22a that manipulates beam deflection, and a laser beam emitted by a laser generator 21 may be emitted to the MEMS reflective scanning oscillator 22a. As shown in FIG. 5, the MEMS scanning modulator may be alternatively an MEMS actuator configured to drive optical fiber scanning, and a laser beam emitted by the laser generator 21 passes through an optical fiber 50 to the MEMS actuator 22b.

The holographic reflective optical fusion device 30 may also be referred to as a holographic reflective film. The holographic reflective optical fusion device 30 is a transparent reflective film manufactured according to a holographic principle, and is characterized by playing a reflection effect only on light of a specific incident angle and a specific wavelength, and exerting no impact on transmission of ambient light of another band. Therefore, the holographic reflective optical fusion device 30 may reflect the at least two laser beam groups provided by the laser projection optical engine 20 to a user's eye, so that at least two virtual images are modulated to two different focal planes, and the user can simultaneously view two displayed images with different depths. This avoids or alleviates dizziness and discomfort caused by a vergence-accommodation conflict during usage of the user.

Figure 6:
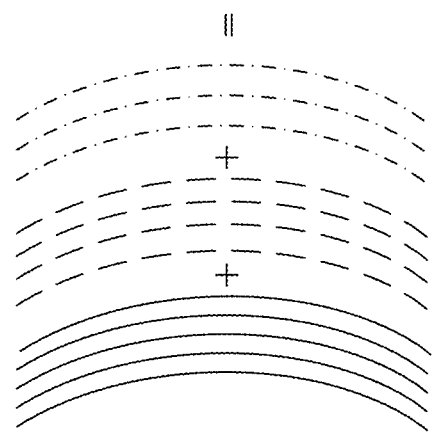
FIG. 6 is a schematic structural diagram of a holographic reflective film according to an embodiment of this application.

In an embodiment, a raw material of the holographic reflective film includes precursors (Precursor) and imaging components that are arranged in a matrix. In a film forming process, precursors form, through in-situ formation (In-situ formation), a film substrate of a cross-linked matrix structure, and imaging components with a photosensitive characteristic are distributed in the film substrate. In a holographic film manufacturing process, a laser light emitted by a laser is split into two lights by a splitter. One light is used as an illumination light, and is irradiated to the film substrate from one side after undergoing wavefront modulation by a physical object (for example, a concave reflector) or a spatial light modulator (also referred to as a wavefront generator). The other light is used as a reference light, and is irradiated to the film substrate from another side. The two laser lights have a same wavelength, and therefore interfere with each other inside the film substrate. An interference fringe is formed, thereby inducing photopolymerization (exposure), and forming a holographic microstructure corresponding to the interference fringe in the film. In this way, the holographic reflective film is manufactured. FIG. 6 is a schematic structural diagram of a holographic reflective film according to an embodiment of this application. As shown in FIG. 6, the holographic reflective film includes a holographic function layer, and the holographic function layer includes three holographic microstructures. Optionally, each holographic microstructure may reflect a laser beam with one wavelength. In the example shown in FIG. 6, laser beams of three wavelengths may be reflected: red, green, and blue laser beams. A person skilled in the art can understand that when another light, such as an infrared light, needs to be reflected from the holographic function layer, the holographic function layer may further include a holographic microstructure corresponding to the another light.

In an embodiment, the multi—focal plane display system may further include a relay optical component 40, configured to separately correct laser beams that are of different scanning fields of view and that are emitted by the laser projection optical engine. The relay optical component 40 may be a component including an optical lens (group) or a binary optical element. A person skilled in the art can understand that the zoom relay optical component 40 may be alternatively a component of the laser projection optical engine. In this embodiment, for ease of description and drawing, the relay optical component 40 is drawn outside the laser projection optical engine.

In an embodiment, the multi-focal plane display system further includes a display controller 10. The display controller 10 is configured to send configuration information to the laser projection optical engine, where the configuration information is information used by the laser projection optical engine to modulate at least two displayed images.

In an embodiment, the display controller 10 may decode and render a virtual image to generate the configuration information. The configuration information may be used to configure and control the laser projection optical engine, so that the laser projection optical engine modulates two displayed images. In an embodiment, the display controller 10 may further implement a network connection to another device through a wired or wireless connection, so that the display controller 10 may obtain to-be-augmented content from the another device.

A person skilled in the art can understand that, as shown in FIG. 3, in a specific implementation process, a display controller, a laser projection optical engine, a holographic reflective optical fusion device, and a relay optical component may be disposed for each of a left eye and a right eye of a user. The display controller may generate, based on the displayed images, different configuration information for a displayed image seen by the left eye of the user or a displayed image seen by the right eye of the user. In an embodiment, one display controller may be alternatively configured for the left eye and the right eye, and the display controller sends configuration information to laser projection optical engines respectively corresponding to the left eye and the right eye.

As shown in FIG. 3, two focal planes are used as examples for description. A solid line represents optical path transmission. Two laser beam groups generated and modulated by the laser projection optical engine 20 are transmitted to the holographic reflective optical fusion device 30 through the relay optical component 40, and the holographic reflective optical fusion device 30 reflects the two laser beam groups to the user's eyes. A dashed line represents the user's field of view. Within a range of the field of view, the user sees a displayed image presented on a focal plane 1 with a depth of D1 and a displayed image presented on a focal plane 2 with a depth of D2. In this embodiment, for ease of description, the displayed images are drawn as a cube and a cylinder. A person skilled in the art can understand that, in a specific implementation process, displayed images presented on a plurality of focal planes may be images of a same object at different depths.

In an embodiment, the system may further include an eyeball tracking device, configured to determine a gaze direction of the user, and the display controller may generate the configuration information based on the gaze direction, and send the configuration information to the laser projection optical engine.

In the multi-focal plane display system provided in this embodiment of this application, the laser projection optical engine generates and modulates the at least two laser beam groups, and transmits the at least two laser beam groups to the holographic reflective optical fusion device, where each laser beam group corresponds to one displayed image; and the holographic reflective optical fusion device reflects the at least two laser beam groups, where the exit pupil locations of the at least two laser beam groups are the same, so that the displayed images of the at least two focal planes are obtained by performing imaging on the at least two laser beam groups by the human eye. With the laser projection optical engine and the holographic reflective optical fusion device, a simplified architecture of the multi-focal plane display system is implemented, thereby facilitating manufacturing of AR and VR devices.

Specific embodiments are used below to describe in detail the technical solutions of this application. The following specific embodiments may be combined with one another. A same or similar concept or process may not be described in detail in some embodiments, and a same structure may not be marked in some embodiments.

In an embodiment, it can be understood that the displayed images of the at least two focal planes may be generated through independent modulation or time division modulation. In this embodiment, for ease of description, two focal planes are usually used as examples in various examples. An implementation for a plurality of focal planes is similar, and details are not described herein again in this embodiment.

For example, a process of independent modulation is as follows: After decoding virtual images, the display controller separately renders two virtual images, transfers a rendering signal of a virtual image 1 to a light source 1 in the laser projection optical engine, and transfers a rendering signal of a virtual image 2 to a light source 2 in the laser projection optical engine. Then the laser projection optical engine simultaneously performs light source modulation and scanning modulation to obtain a laser beam group 1 and a laser beam group 2. After the laser beam group 1 is reflected out of a pupil by the holographic reflective optical fusion device, the user's eye receives a presentation of a displayed image on the focal plane 1 with the depth of D1. After the laser beam group 2 is reflected out of the pupil by the holographic reflective optical fusion device, the user's eye receives a presentation of a displayed image on the focal plane 2 with the depth of D2. The process of independent modulation is described by using examples with reference to FIG. 7 to FIG. 9.

For example, a process of time division modulation is as follows: After decoding displayed images, the display controller performs rendering frame by frame in a time division manner, to obtain two displayed images, for example, a displayed image 1 is formed by odd frames, and a displayed image 2 is formed by even frames. After rendering signals of the two displayed images are transferred to the laser projection optical engine, the laser projection optical engine performs light source modulation and scanning modulation to obtain a laser beam group 1 and a laser beam group 2. After the laser beam group 1 is reflected out of a pupil by the holographic reflective optical fusion device, the user's eye receives a presentation of a displayed image on the focal plane 1 with the depth of D1. After the laser beam group 2 is reflected out of the pupil by the holographic reflective optical fusion device, the user's eye receives a presentation of a displayed image on the focal plane 2 with the depth of D2. The process of time division modulation is described by using examples with reference to FIG. 10 and FIG. 11.

In an embodiment, it can be understood that the displayed images of the at least two focal planes may be generated by adjusting a parameter of a laser beam in the laser beam groups. The parameter may be a wavelength or a divergence angle.

In a possible implementation, when the parameter is the wavelength, a preset wavelength difference exists between a $j^{th}$ laser beam in an $i^{th}$ laser beam group and a $j^{th}$ laser beam in a $k^{th}$ laser beam group, and i, j, and k are integers greater than or equal to 1. The preset wavelength difference may be determined based on color sensitivity of the user's eyes. For example, when a wavelength difference between two laser beams is 10 nanometers, the user's eyes cannot distinguish between different colors corresponding to laser beams with the preset wavelength difference.

In an embodiment, a divergence angle of the $j^{th}$ laser beam in the $i^{th}$ laser beam group is equal to that of the $j^{th}$ laser beam in the $k^{th}$ laser beam group. For example, a same divergence angle may be implemented when a laser chip generates laser beams, or laser beams may be shaped by using the relay optical component 40 to implement a same divergence angle. A manner of implementing a same divergence angle is not particularly limited in this embodiment.

In an embodiment, at least two holographic function layers are disposed in the holographic reflective optical fusion device by using wavelength selectivity of the holographic reflective optical fusion device. Each holographic function layer is configured to reflect one of the at least two laser beam groups, and different holographic function layers reflect different laser beam groups, so that the displayed images of the at least two focal planes are obtained by performing imaging on the at least two laser beam groups by the human eye. The following provides descriptions with reference to embodiments of FIG. 7 and FIG. 8.

In an embodiment, the laser beam group includes at least one laser beam, and wavelengths of all laser beams included in any group are different from wavelengths of laser beams included in another group. In addition, a wavelength difference between every two laser beams of all the laser beams is greater than a sensitive wavelength difference of the holographic reflective optical fusion device. As described above, the holographic reflective optical fusion device includes a holographic function layer, and the holographic function layer includes a holographic microstructure. The sensitive wavelength difference indicates a fluctuation range of a wavelength that can be reflected by the holographic microstructure. For example, the sensitive wavelength difference is 2 nanometers. If the holographic microstructure can reflect a laser beam with a wavelength of 640 nanometers, a laser beam with a wavelength of 639 nanometers or 641 nanometers may also be reflected by the holographic microstructure. Therefore, a wavelength difference between every two laser beams is greater than the sensitive wavelength difference, to avoid a problem that laser beams with different wavelengths are reflected by a same holographic function layer and a plurality of focal planes cannot be implemented.

In an embodiment, preset wavelength differences between every two groups of corresponding laser beams may be the same or different. For example, a preset wavelength difference between a first laser beam in a first laser beam group and a first laser beam in a second laser beam group is 10 nanometers, and a preset wavelength difference between a first laser beam in a third laser beam group and the first laser beam in the second laser beam group is 8 nanometers. Preset wavelength differences between laser beams in each group and laser beams in another group may be the same or different. For example, a preset wavelength difference between a first laser beam in a first laser beam group and a first laser beam in a second laser beam group is 10 nanometers, and a preset wavelength difference between a second laser beam in the first laser beam group and a second laser beam in the second laser beam group is 8 nanometers.

In an embodiment, when the parameter is the divergence angle, a wavelength of a $j^{th}$ laser beam in an $i^{th}$ laser beam group is the same as that of a $j^{th}$ laser beam in a $k^{th}$ laser beam group, wavelengths of laser beams in the laser beam group are different, and i, j, and k are integers greater than or equal to 1. The holographic reflective optical fusion device includes a holographic function layer. Focal planes of displayed images obtained after laser beams with a same wavelength but different divergence angles are reflected by the holographic reflective optical fusion device and undergo imaging by a human eye are different, so that the displayed images of the at least two focal planes are obtained by performing imaging on the at least two laser beam groups by the human eye. The following provides descriptions with reference to embodiments of FIG. 9 to FIG. 11.

In an embodiment, a quantity of laser beams in the $i^{th}$ laser beam group is less than or equal to a quantity of laser beams in the $k^{th}$ laser beam group. For example, when the two laser beam groups each include three types of laser beams: red, green, and blue laser beams, the quantity of laser beams in the $i^{th}$ laser beam group is equal to the quantity of laser beams in the $k^{th}$ laser beam group. For example, when the $k^{th}$ laser beam group further includes an infrared light, the quantity of laser beams in the $i^{th}$ laser beam group is less than the quantity of laser beams in the $k^{th}$ laser beam group.

Figure 7:
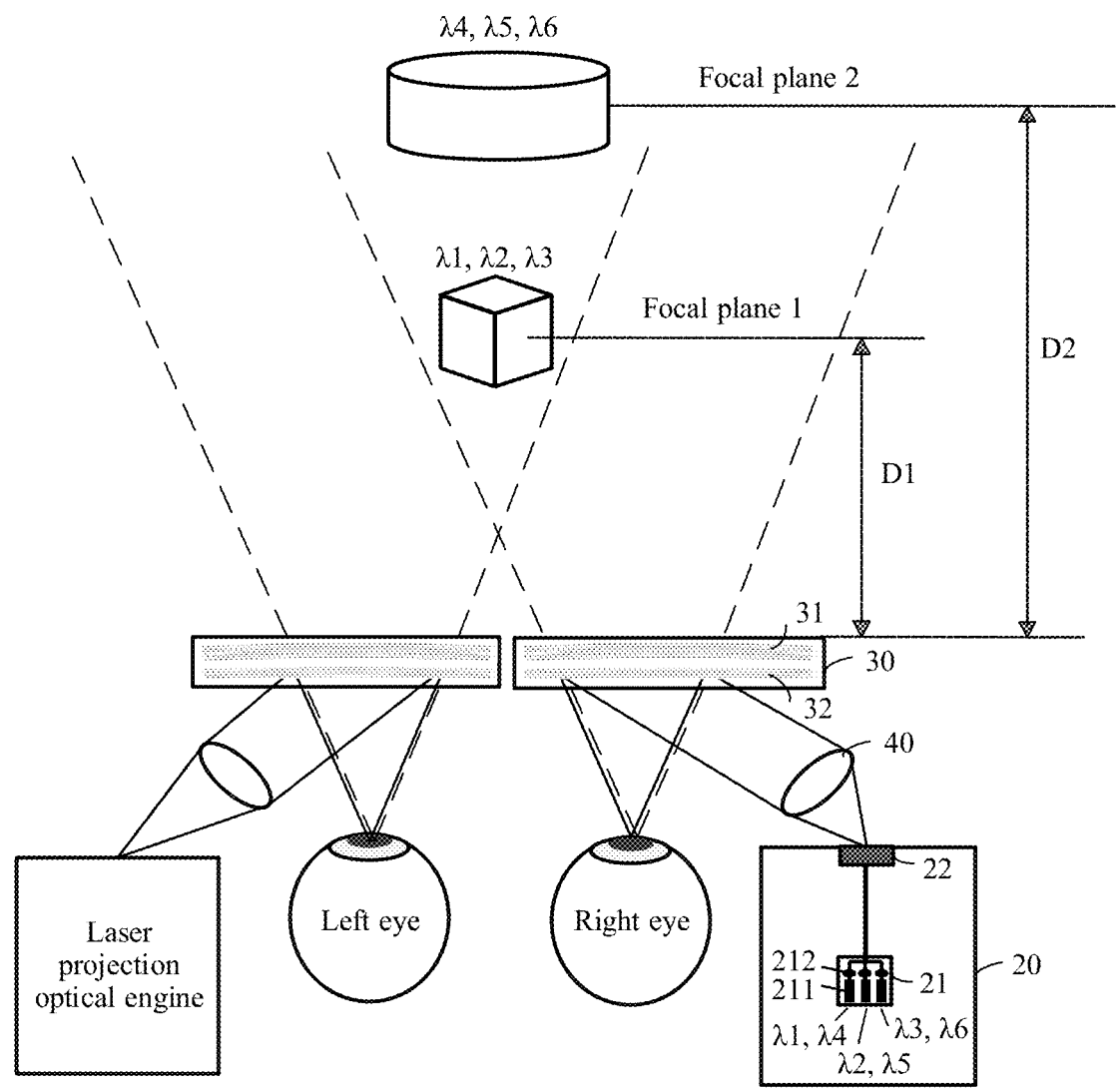
FIG. 7 is a schematic structural diagram 2 of a multi-focal plane display system according to an embodiment of this application.

FIG. 7 is a schematic structural diagram 2 of a multi-focal plane display system according to an embodiment of this application. As shown in FIG. 7, the multi-focal plane display system includes a laser projection optical engine 20 and a holographic reflective optical fusion device 30, and optionally, further includes a relay optical component 40.

The laser projection optical engine 20 includes a laser generator 21 and a scanning modulator 22.

The laser generator 21 includes at least one laser chip 211. Each laser chip 211 is configured to generate laser beams of different wavelengths in a time division manner. The at least one laser chip is configured to generate at least two laser beam groups in a time division manner. The laser beam groups include laser beams generated by all laser chips at a same moment. The laser chip 211 may be a tunable laser chip, and the tunable laser chip generates laser beams of at least two wavelengths through time division tuning.

In an embodiment, the laser generator 21 further includes a beam shaping component 212. The laser chip 211 may be a red-green-blue (RGB) laser chip. To be specific, a red-green-blue color mode is used, and various colors are obtained by changing three color channels: red, green, and blue, and superposing the three color channels. In this embodiment, a laser chip in another color mode may be alternatively used. This is not particularly limited herein in this embodiment.

The laser chip 211 may generate a plurality of laser beams with a preset wavelength difference in a time division manner. During progressive increasing of a wavelength, when a plurality of preset wavelength differences exist, the plurality of preset wavelength differences may be equal or unequal. This is not particularly limited in this embodiment.

As shown in FIG. 7, the laser generator 21 includes three laser chips 211. One laser chip may generate laser beams with wavelengths of $\lambda_1$ and $\lambda_4$ in a time division manner, another laser chip may generate laser beams with wavelengths of $\lambda_2$ and $\lambda_5$ in a time division manner, and the last laser chip may generate laser beams with wavelengths of $\lambda_3$ and $\lambda_6$ in a time division manner.

The laser beam groups include laser beams generated by all the laser chips at a same moment. For example, a first laser beam group includes laser beams, with wavelengths of $\lambda_1$ (640 nm), $\lambda_2$ (520 nm), and $\lambda_3$ (450 nm), that are generated by the three laser chips 211 at a first moment; and a second laser beam group includes laser beams, with wavelengths of $\lambda_4$ (650 nm), $\lambda_5$ (510 nm), and $\lambda_6$ (460 nm), that are generated by the three laser chips 211 at a second moment. A preset wavelength difference between $\lambda_1$ and $\lambda_4$, between $\lambda_2$ and $\lambda_5$, and between $\lambda_3$ and $\lambda_6$ is 10 nm. A setting of the preset wavelength difference depends on wavelength selection sensitivity of the holographic reflective optical fusion device, and laser light sources corresponding to $\lambda_1$ and $\lambda_4$, $\lambda_2$ and $\lambda_5$, and $\lambda_3$ and $\lambda_6$ may be separately modulated. The scanning modulator 22 may modulate the at least two laser beam groups, so that laser beams in the laser beam groups are emitted to the holographic reflective optical fusion device 30 at different deflection angles.

The holographic reflective optical fusion device 30 is configured to reflect two laser beam groups projected by the laser projection optical engine 20, so that exit pupil locations of the two laser beam groups are the same. The holographic reflective optical fusion device 30 includes a holographic function layer 1 (31) for $\lambda_1$, $\lambda_2$, and $\lambda_3$, and a holographic function layer 2 (32) for $\lambda_5$, and $\lambda_6$. An optical modulation capability 1, for beams, of the holographic function layer 1 acting on $\lambda_1$, $\lambda_2$, and $\lambda_3$ is different from an optical modulation capability 2 of the holographic function layer 2 acting on $\lambda_4$, $\lambda_5$, and $\lambda_6$. After the holographic function layer 1 with the optical modulation capability 1 reflects the first laser beam group including $\lambda_1$, $\lambda_2$, and $\lambda_3$, a displayed image whose focal plane is a focal plane 1 is obtained through imaging by a human eye. After the holographic function layer 2 with the optical modulation capability 2 reflects the second laser beam group including $\lambda_4$, $\lambda_5$, and $\lambda_6$, a displayed image whose focal plane is a focal plane 2 is obtained through imaging by the human eye. In this case, dual-focal plane display is formed in the system. By analogy, display can be implemented on more focal planes.

The laser generator provided in this embodiment of this application includes at least one laser chip. Each laser chip is configured to generate laser beams of different wavelengths in a time division manner. The at least one laser chip is configured to generate a plurality of laser beam groups in a time division manner. The holographic reflective optical fusion device includes at least two holographic function layers. Each holographic function layer is configured to reflect a laser beam group. The laser beam group generates a displayed image of a focal plane through imaging by a human eye, so as to generate a plurality of focal planes. A structure is simple and easy to implement.

Figure 8:
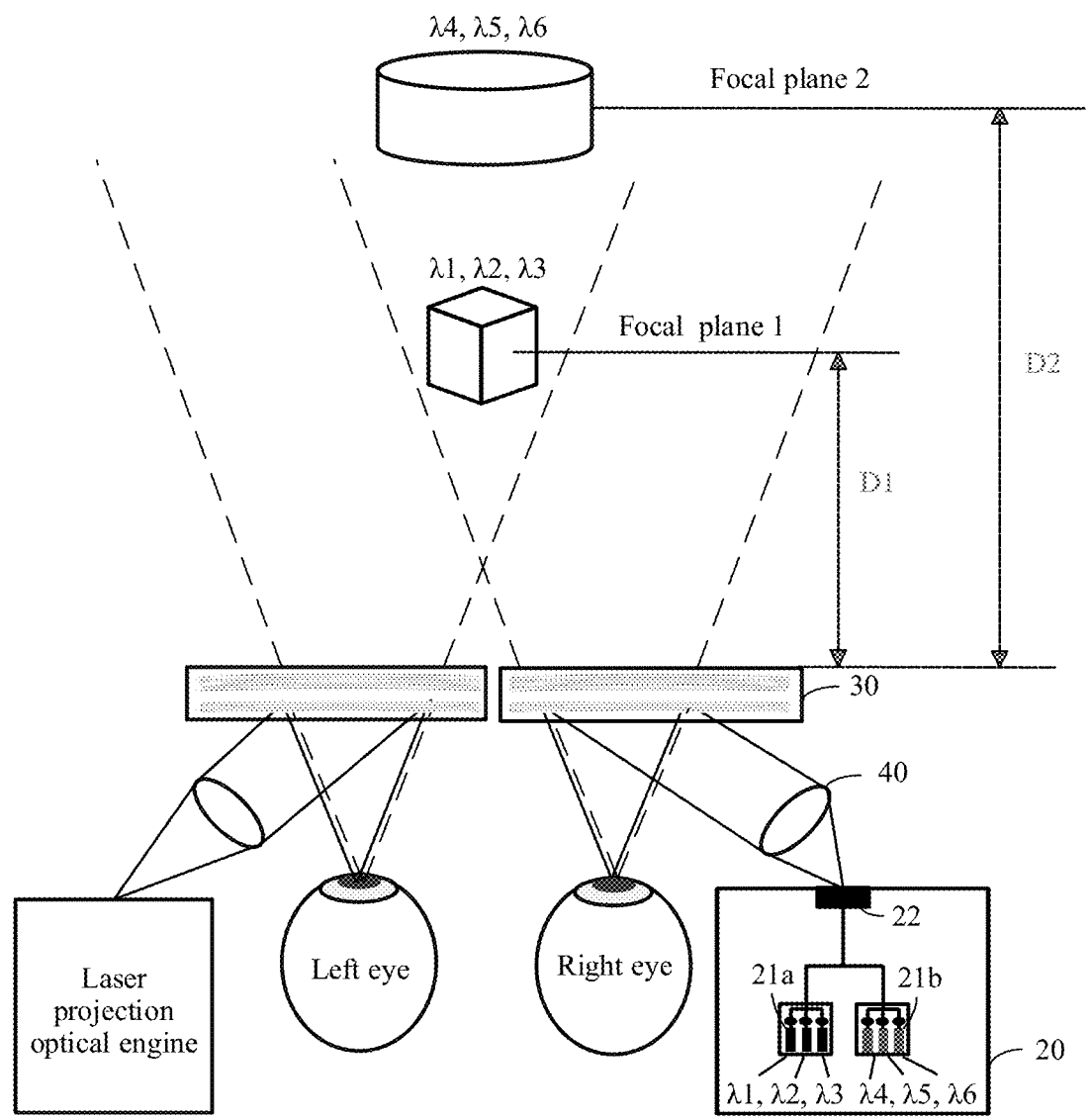
FIG. 8 is a schematic structural diagram 3 of a multi-focal plane display system according to an embodiment of this application.

FIG. 8 is a schematic structural diagram 3 of a multi-focal plane display system according to an embodiment of this application. A difference between this embodiment of this application and the embodiment shown in FIG. 7 lies in that this embodiment of this application provides two laser chipsets, which can simultaneously generate two laser beam groups. As shown in FIG. 8, the multi-focal plane display system includes a laser projection optical engine 20 and a holographic reflective optical fusion device 30, and optionally, further includes a relay optical component 40.

The laser projection optical engine 20 includes a laser generator and a scanning modulator 22.

The laser generator includes at least two laser chipsets. Each laser chipset includes at least one laser chip. The laser chip is configured to generate a laser beam with one wavelength. The laser chipset is configured to generate a laser beam group.

In FIG. 8, the laser generator includes two laser chipsets. A first laser chipset includes three laser chips 21a, and a second laser chipset includes three laser chips 21b. In an embodiment, each laser chip 21a is correspondingly connected to a beam shaping component, and each laser chip 21b is correspondingly connected to a beam shaping component.

Each laser chipset generates one laser beam group, and therefore two laser beam groups are obtained. A person skilled in the art can understand that the two laser beam groups may be generated simultaneously, or may be generated in a time division manner. The first laser chipset including the laser chips 21a generates a first laser beam group with wavelengths of $\lambda_1$ (640 nm), $\lambda_2$ (520 nm), and $\lambda_3$ (450 nm). A second laser chipset including the laser chips 21b generates a second laser beam group with wavelengths of $\lambda_4$ (650 nm), $\lambda_5$ (510 nm), and $\lambda_6$ (460 nm). A preset wavelength difference between $\lambda_1$ and $\lambda_4$, between $\lambda_2$ and $\lambda_5$, and between $\lambda_3$ and $\lambda_6$ is 10 nm. The scanning modulator 22 may modulate at least two laser beam groups, so that laser beams in the laser beam groups are emitted to the holographic reflective optical fusion device 30 at different deflection angles.

A structure of the holographic reflective optical fusion device 30 in this embodiment is similar to that in the embodiment shown in FIG. 7. The holographic reflective optical fusion device 30 includes a holographic function layer 1 for $\lambda_1$, $\lambda_2$, and $\lambda_3$, and a holographic function layer 2 for $\lambda_4$, $\lambda_5$, and $\lambda_6$. After the holographic function layer 1 with an optical modulation capability 1 reflects a first laser beam group including $\lambda_1$, $\lambda_2$, and $\lambda_3$, a displayed image whose focal plane is a focal plane 1 is obtained through imaging by a human eye. After the holographic function layer 2 with an optical modulation capability 2 reflects a second laser beam group including $\lambda_4$, $\lambda_5$, and $\lambda_6$, a displayed image whose focal plane is a focal plane 2 is obtained through imaging by the human eye. In this case, dual-focal plane display is formed in the system. By analogy, display can be implemented on more focal planes.

The laser generator provided in this embodiment of this application includes at least two laser chipsets. For any laser chipset, the laser chipset includes at least one laser chip. For any laser chip, the laser chip is configured to generate a laser beam with one wavelength. Therefore, the laser chipset is configured to generate a laser beam group. The holographic reflective optical fusion device includes at least two holographic function layers. Each holographic function layer is configured to reflect a laser beam group. The laser beam group generates a displayed image of a focal plane through imaging by a human eye, so as to generate a plurality of focal planes. A structure is simple and easy to implement.

Figure 9:
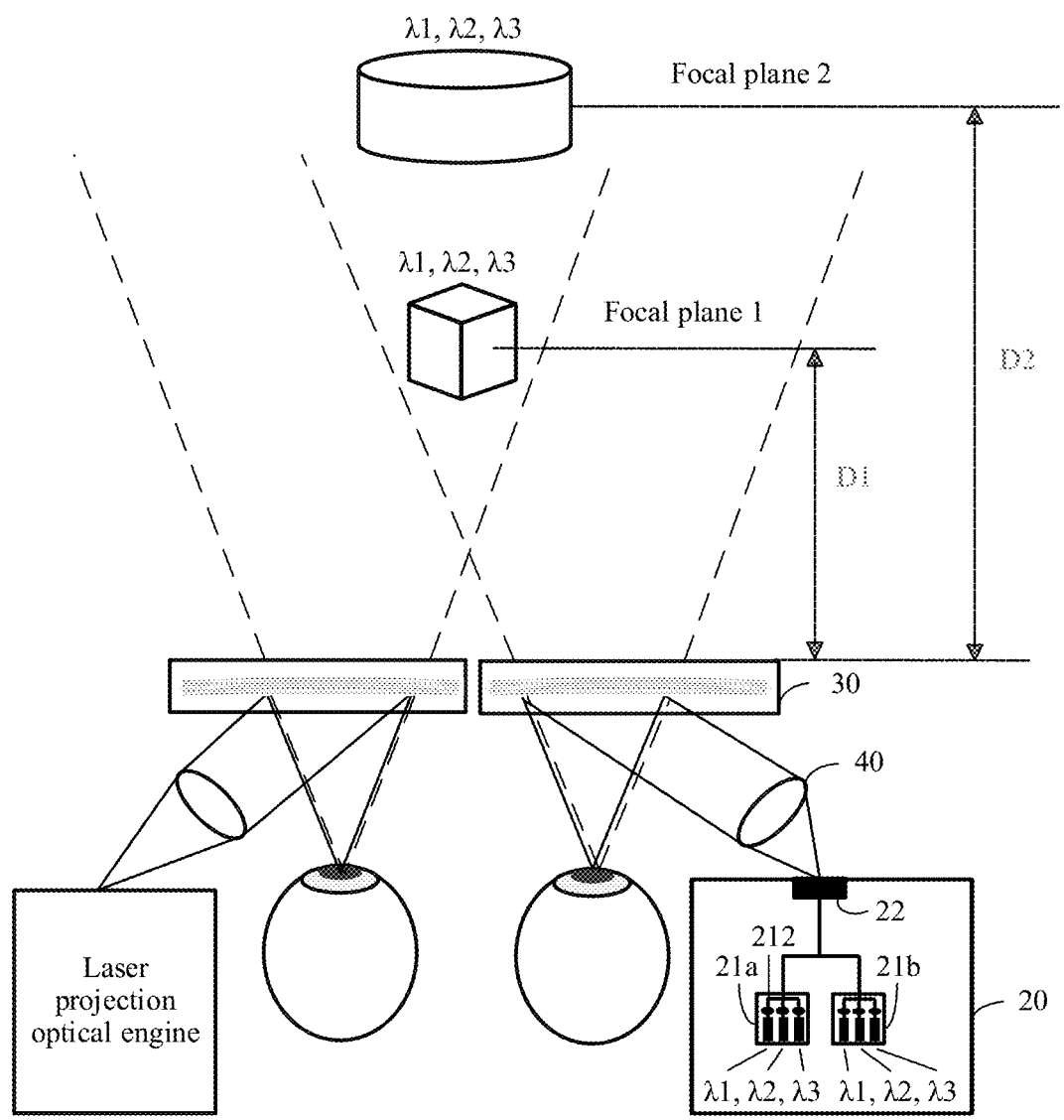
FIG. 9 is a schematic structural diagram 4 of a multi-focal plane display system according to an embodiment of this application.

FIG. 9 is a schematic structural diagram 4 of a multi-focal plane display system according to an embodiment of this application. As shown in FIG. 9, the multi-focal plane display system includes:

a laser projection optical engine 20 and a holographic reflective optical fusion device 30, and optionally, further includes a relay optical component 40.

The laser generator includes at least two laser chipsets and a beam shaping component that is in a one-to-one correspondence with each laser chip in the laser chipsets. For any laser chipset, the laser chipset includes at least one laser chip. For any laser chip, the laser chip is configured to generate a laser beam with one wavelength. The holographic reflective optical fusion device includes a holographic function layer.

The beam shaping component is configured to shape a laser beam generated by a laser chip, so that divergence angles of all laser beams with a same wavelength are different. Focal planes of displayed images obtained after the laser beams with different divergence angles are reflected by the holographic reflective optical fusion device and undergo imaging by a human eye are different.

In an embodiment, a laser chip and a beam shaping component may be in a one-to-one correspondence. Optionally, a plurality of laser chips may alternatively correspond to one beam shaping component. A correspondence between a laser chip and a beam shaping component is not particularly limited in this embodiment, provided that the beam shaping component can shape each laser beam group, so that divergence angles of all laser beams with a same wavelength are different, and the holographic reflective optical fusion device 30 can perform reflection to obtain displayed images of at least two focal planes.

In FIG. 9, the laser generator includes two laser chipsets. A first laser chipset includes three laser chips 21$a$, and a second laser chipset includes three laser chips 21$b$. Each laser chipset generates one laser beam group, and therefore two laser beam groups are obtained.

The first laser chipset including the laser chips 21$a$ generates a first laser beam group with wavelengths of $\lambda_1$ (640 nm), $\lambda_2$ (520 nm), and $\lambda_3$ (450 nm). A second laser chipset including the laser chips 21$b$ generates a second laser beam group with wavelengths of $\lambda_1$ (640 nm), $\lambda_2$ (520 nm), and $\lambda_3$ (450 nm). A wavelength of a $j^{th}$ laser beam in an $i^{th}$ laser beam group is the same as that of a $j^{th}$ laser beam in a $k^{th}$ laser beam group. After the two laser beam groups pass a beam shaping component, divergence angles of two laser beams with the wavelength of $\lambda_1$ are different, divergence angles of two laser beams with the wavelength of $\lambda_2$ are different, and divergence angles of two laser beams with the wavelength of $\lambda_3$ are different. Divergence angles of laser beams in a same laser beam group may be the same or different. This is not particularly limited herein. The scanning modulator 22 may modulate at least two laser beam groups, so that laser beams in the laser beam groups are emitted to the holographic reflective optical fusion device 30 at different deflection angles.

In an embodiment, the holographic reflective optical fusion device 30 includes a holographic function layer. The holographic function layer includes a reflective holographic microstructure for the wavelengths $\lambda_1$, $\lambda_2$, and $\lambda_3$, and is configured to reflect two laser beam groups. Focal planes of displayed images obtained after laser beams with a same wavelength but different divergence angles are reflected by the holographic reflective optical fusion device and undergo imaging by a human eye are different. Therefore, after finally being reflected by the holographic reflective optical fusion device 30, a first laser beam group falls on a focal plane 1, and a second laser beam group falls on a focal plane 2. In this case, dual-focal plane display is formed in the system. By analogy, display can be implemented on more focal planes.

The laser generator provided in this embodiment of this application includes at least two laser chipsets, and a beam shaping component that is in a one-to-one correspondence with each laser chip in the laser chipsets. The laser chipset includes at least one laser chip, and the laser chip generates a laser beam with one wavelength. The holographic reflective optical fusion device includes the holographic function layer. The laser chipset generates a laser beam group. The wavelength of the $j^{th}$ laser beam in the $i^{th}$ laser beam group is the same as that of the $j^{th}$ laser beam in the $k^{th}$ laser beam group. The beam shaping component shapes the laser beam generated by the laser chip, so that divergence angles of all laser beams with a same wavelength are different. Because focal planes of displayed images obtained after laser beams with a same wavelength but different divergence angles are reflected by the holographic reflective optical fusion device and undergo imaging by a human eye are different, multi-focal plane display is implemented. A structure is simple and easy to implement.

Figure 10:
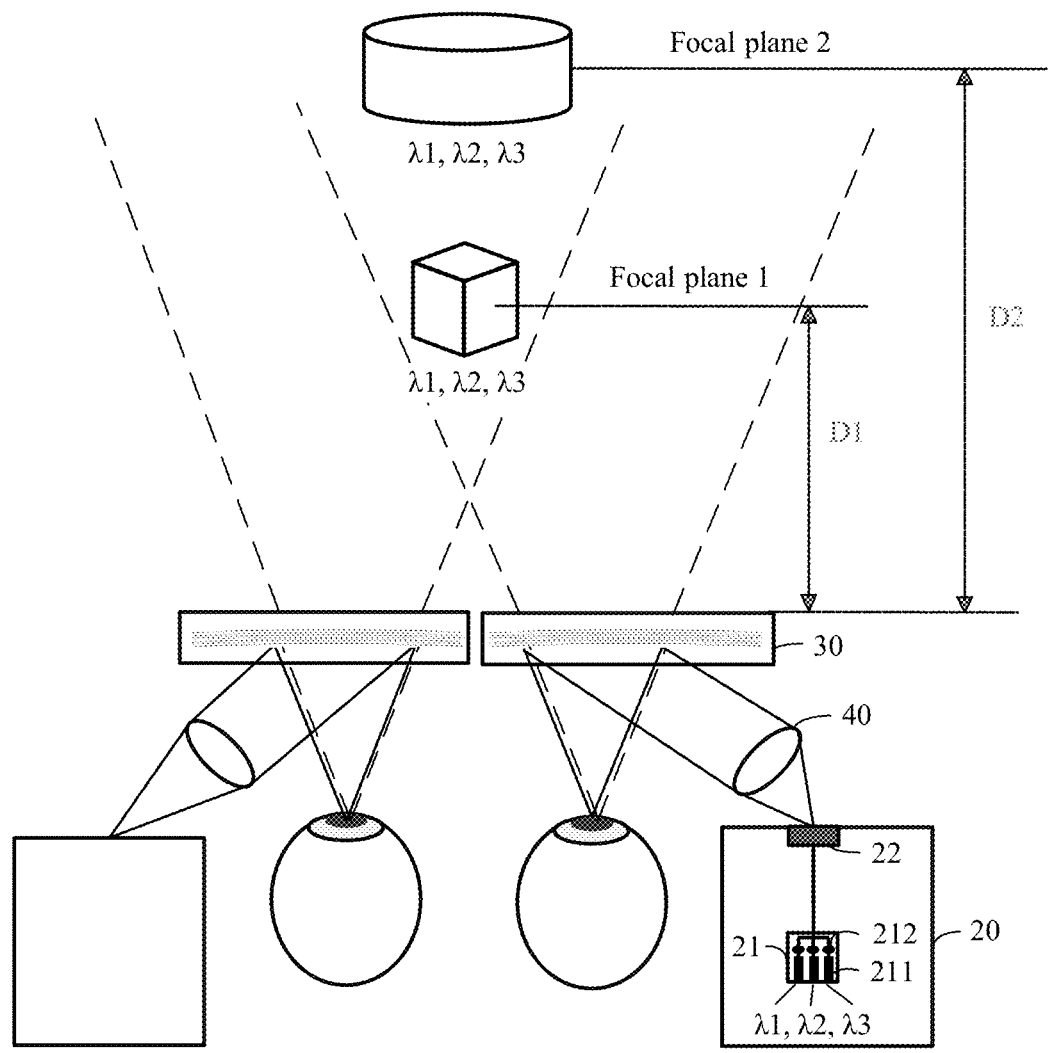
FIG. 10 is a schematic structural diagram 5 of a multi-focal plane display system according to an embodiment of this application.

FIG. 10 is a schematic structural diagram 5 of a multi-focal plane display system according to an embodiment of this application. As shown in FIG. 10, the multi-focal plane display system includes a laser projection optical engine 20 and a holographic reflective optical fusion device 30, and optionally, further includes a relay optical component 40.

The laser projection optical engine 20 includes a laser generator 21 and a scanning modulator 22. Optionally, the laser generator 21 includes:

at least one laser chip 211, where the laser chip 211 is configured to generate a laser beam with one wavelength; and a zoom beam shaping component 212 that is in a one-to-one correspondence with each laser chip, configured to shape, in a time division manner, a laser beam generated by a laser chip corresponding to the zoom beam shaping component into laser beams with at least two divergence angles, where the laser beam group includes laser beams shaped by the zoom beam shaping component at a same moment. The zoom beam shaping component 212 may be a liquid lens, an MEMS reflector array, a zoom lens group, or the like.

In an embodiment, a laser chip may be in a one-to-one correspondence with a zoom beam shaping component. Optionally, a plurality of laser chips may alternatively correspond to one zoom beam shaping component. A correspondence between a laser chip and a zoom beam shaping component is not particularly limited in this embodiment.

The scanning modulator 22 may modulate at least two laser beam groups, so that laser beams in the laser beam groups are emitted to the holographic reflective optical fusion device 30 at different deflection angles. The holographic reflective optical fusion device 30 includes a holographic function layer. Focal planes of displayed images obtained after laser beams with a same wavelength but different divergence angles are reflected by the holographic reflective optical fusion device and undergo imaging by a human eye are different.

In an embodiment, three laser chips generate three laser beams with wavelengths of $\lambda_1$ (640 nm), $\lambda_2$ (520 nm), and $\lambda_3$ (450 nm). A virtual image 1 corresponds to odd frames, and a virtual image 2 corresponds to even frames. The zoom beam shaping component 212 modulates the laser beams in a time-division manner, so that a divergence angle of a same laser beam is always a divergence angle 1 in an odd frame in a time sequence, and a divergence angle of a same laser beam is always a divergence angle 2 in an even frame in the time sequence. A first laser beam group includes laser beams corresponding to odd frames in the time sequence, and a second laser beam group includes laser beams corresponding to even frames in the time sequence.

The scanning modulator 22 transmits the laser beams to the holographic reflective optical fusion device 30. The holographic reflective optical fusion device 30 includes a holographic function layer for the wavelengths $\lambda_1$ (640 nm), $\lambda_2$ (520 nm), and $\lambda_3$ (450 nm). After being reflected by the holographic reflective optical fusion device 30, the first laser beam group falls on a focal plane 1, and the second laser beam group falls on a focal plane 2. In this case, dual-focal plane display is formed in the system. By analogy, display can be implemented on more focal planes.

The laser generator provided in this embodiment of this application includes: the at least one laser chip, where the laser chip is configured to generate a laser beam; and the zoom beam shaping component that is in a one-to-one correspondence with each laser chip, configured to shape, in a time division manner, a laser beam generated by a laser chip corresponding to the zoom beam shaping component into laser beams with at least two divergence angles, where the laser beam group includes laser beams shaped by the zoom beam shaping component at a same moment. Focal planes of displayed images obtained after laser beams with a same wavelength but different divergence angles are reflected by the holographic reflective optical fusion device and undergo imaging by a human eye are different. A structure is simple and easy to implement.

Figure 11:
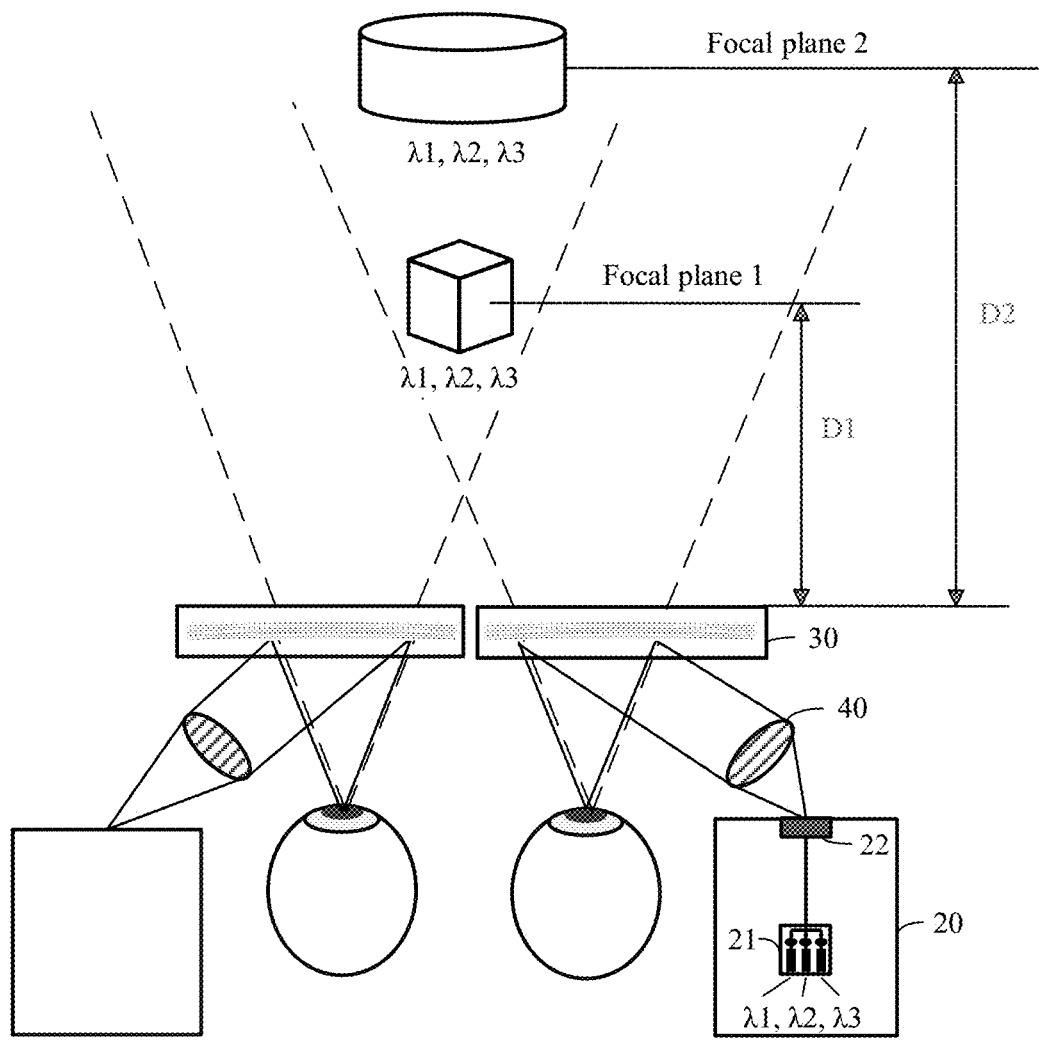
FIG. 11 is a schematic structural diagram 6 of a multi-focal plane display system according to an embodiment of this application.

FIG. 11 is a schematic structural diagram 6 of a multi-focal plane display system according to an embodiment of this application. A difference between this embodiment and the embodiment in FIG. 10 mainly lies in that modulation of a laser beam is performed by a zoom relay optical component. To be specific, similar to the foregoing, a laser projection optical engine performs time division modulation, so that laser beams of two projected images have different divergence angles to form a plurality of focal planes. As shown in FIG. 11, the multi-focal plane display system includes:

a laser projection optical engine 20, a holographic reflective optical fusion device 30, and a zoom relay optical component 40.

The laser projection optical engine 20 includes a laser generator 21 and a scanning modulator 22.

In an embodiment, the laser generator 21 includes at least one laser chip, and the laser chip is configured to generate a laser beam with one wavelength.

The scanning modulator 22 is configured to modulate the at least one laser beam, so that the at least one laser beam is emitted to the holographic reflective optical fusion device 30 at different deflection angles.

The laser beam emitted into the holographic reflective optical fusion device 30 further needs to first pass through the zoom relay optical component 40. The zoom relay optical component 40 can shape, in a time division manner, a same laser beam into laser beams with at least two divergence angles. A laser beam group includes laser beams shaped by the zoom relay optical component at a same moment.

The zoom relay optical component 40 may be a liquid lens, an MEMS reflector array, a zoom lens group, or the like. An implementation of the zoom relay optical component 40 is not particularly limited in this embodiment.

Laser beams with a same wavelength and different divergence angles are emitted to the holographic reflective optical fusion device 30. The holographic reflective optical fusion device 30 includes a holographic function layer. Focal planes of displayed images obtained after laser beams with a same wavelength but different divergence angles are reflected by the holographic reflective optical fusion device and undergo imaging by a human eye are different.

In an embodiment, three laser chips generate three laser beams with wavelengths of $\lambda_1$ (640 nm), $\lambda_2$ (520 nm), and $\lambda_3$ (450 nm). A virtual image 1 corresponds to odd frames, and a virtual image 2 corresponds to even frames. The scanning modulator 22 transmits the laser beams to the zoom beam shaping component 40. The zoom beam shaping component 40 modulates divergence angles of the laser beams in a time division manner, so that a divergence angle of a same laser beam is always a divergence angle 1 in an odd frame in a time sequence, and a divergence angle of a same laser beam is always a divergence angle 2 in an even frame in the time sequence. A first laser beam group includes laser beams corresponding to odd frames in the time sequence, and a second laser beam group includes laser beams corresponding to even frames in the time sequence.

Laser beams with a same wavelength but different divergence angles are transmitted to the holographic reflective optical fusion device 30. The holographic reflective optical fusion device 30 includes a holographic function layer for the wavelengths $\lambda_1$ (640 nm), $\lambda_2$ (520 nm), and $\lambda_3$ (450 nm). After being reflected by the holographic reflective optical fusion device 30, the first laser beam group falls on a focal plane 1, and the second laser beam group falls on a focal plane 2. In this case, dual-focal plane display is formed in the system. By analogy, display can be implemented on more focal planes.

In an embodiment of this application, the laser generator includes at least one laser chip, and each laser chip is configured to generate a laser beam with one wavelength. The zoom relay optical component shapes, in the time division manner, the same laser beam processed by the scanning modulator into the laser beams with the at least two divergence angles, and transmits the laser beams with the at least two divergence angles to the holographic reflective optical fusion device. The laser beam group includes laser beams shaped by the zoom relay optical component at a same moment. Focal planes of displayed images obtained after laser beams with a same wavelength but different divergence angles are reflected by the holographic reflective optical fusion device and undergo imaging by a human eye are different. A structure is simple and easy to implement.

FIG. 7 to FIG. 11 provide examples of some implementations of a multi-focal plane display system. In a specific implementation process, another embodiment may be derived or extended from the foregoing embodiments, or may be obtained by combining the foregoing embodiments. Various embodiments are not described in detail herein in the embodiments.

An embodiment of this application further provides an augmented reality device. The augmented reality device includes the systems shown in FIG. 3 to FIG. 11. The augmented reality device may be glasses, a helmet, or the like. This is not particularly limited in this embodiment. When the augmented reality device is glasses, a specific structure may be shown in FIG. 12.

Figure 12:
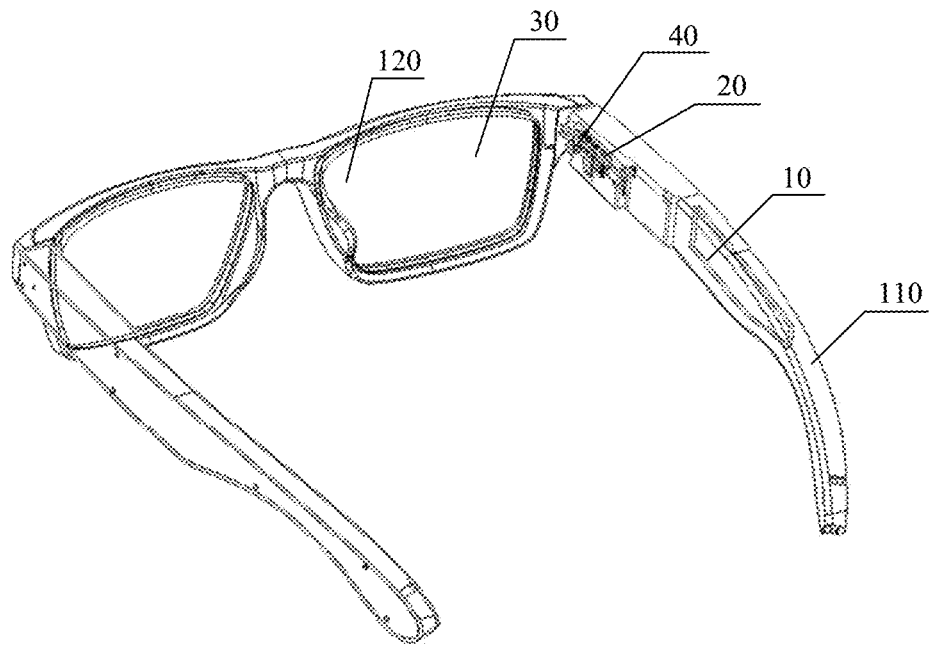
FIG. 12 is a schematic structural diagram of augmented reality glasses according to an embodiment of this application.

FIG. 12 is a schematic structural diagram of augmented reality glasses according to an embodiment of this application. As shown in FIG. 12, the augmented reality glasses include a lens frame 110 and a lens 120. A display controller 10 and a laser projection optical engine 20 are disposed in the lens frame 110. A holographic reflective optical fusion device 30 is disposed on a lens. Optionally, a relay optical component 40 is disposed in the lens frame 110.

The holographic reflective optical fusion device 30 may be fitted to the lens, or may be disposed in the lens as a sandwich layer. A manner of disposing the holographic reflective optical fusion device 30 on the lens is not particularly limited in this embodiment.

In an embodiment of this application, the simplified multi-focal plane display system is used to manufacture augmented reality glasses, the holographic reflective optical fusion device is disposed on a lens so that a structure of the lens is simple and the lens is light, and the laser projection optical engine is disposed in a lens frame. Because structures of the holographic reflective optical fusion device and the laser projection optical engine are light and compact, the lens frame is also characterized by a simple structure and light weight, so that the augmented reality glasses are similar to glasses worn by a user daily, thereby improving user experience.

Figure 13:
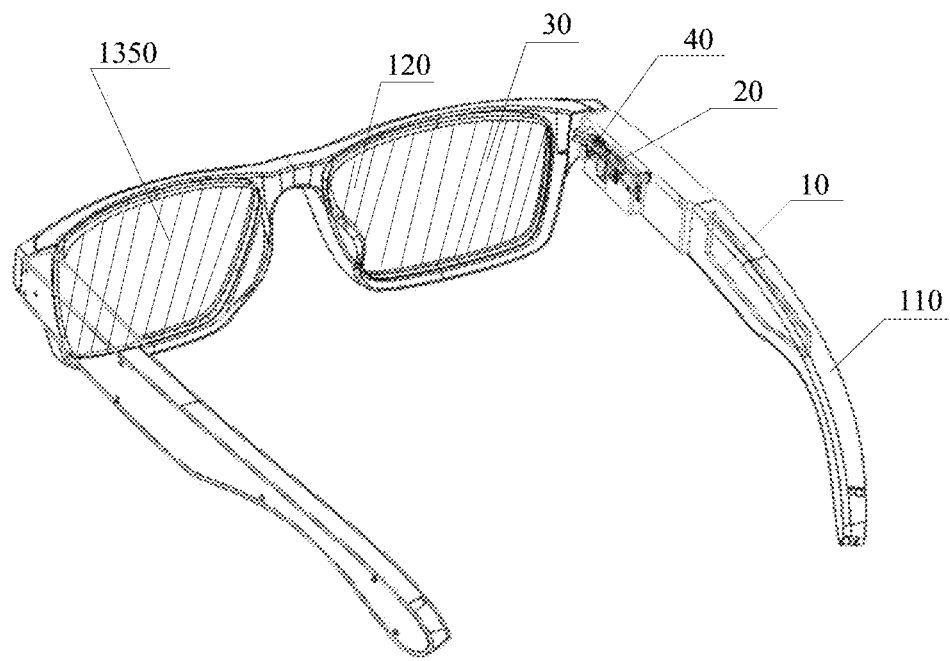
FIG. 13 is a schematic structural diagram of virtual reality glasses according to an embodiment of this application.

FIG. 13 is a schematic structural diagram of virtual reality glasses according to an embodiment of this application. As shown in FIG. 13, an implementation principle of the virtual reality glasses is similar to an implementation principle of the augmented reality glasses shown in FIG. 12. A difference is that a light shield layer 1350 is disposed on a lens of the virtual reality glasses, and the light shield layer 1350 may block light reflected by a real object, so that a user can see only a virtual image, and no real object. The light shield layer 1350 may be a light shield cover, or may be a light shield coating. An implementation of the light shield layer is not particularly limited in this embodiment.

In an embodiment of this application, the simplified multi-focal plane display system is used to manufacture virtual reality glasses, the holographic reflective optical fusion device is disposed on a lens and a light shield layer is disposed on the lens so that a structure of the lens is simple and the lens is light, and the laser projection optical engine is disposed in a lens frame. Because structures of the holographic reflective optical fusion device and the laser projection optical engine are light and compact, the lens frame is also characterized by a simple structure and light weight, so that the virtual reality glasses are similar to glasses worn by a user daily, thereby improving user experience.

In the embodiments of this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be in a singular or plural form. The character "/" usually indicates an "or" relationship between the associated objects. "At least one (piece) of the following" or a similar expression thereof means any combination of these items, including any combination of singular items (pieces) or plural items (pieces). For example, at least one (one piece) of a, b, or c may represent: a, b, c, a-b, a-c, b-c, or a-b-c, where a, b, and c may be singular or plural.

In addition, in the embodiments of this application, unless otherwise specified and limited explicitly, the terms "connected", "connection", "fastening" and "mounting" shall be understood in a general manner, for example, may be a mechanical connection or an electrical connection; and may be a direct connection, an indirect connection by using an intermediate medium, or an internal connection between two components, or interaction relationships between two components. Unless otherwise limited explicitly, a person of ordinary skill in the art may understand specific meanings of the foregoing terms in this application based on a specific situation.

What is claimed is:

1. A multi-focal plane display system, comprising:
a holographic reflective optical fusion device; and
a laser projection optical engine to generate and modulate at least two laser beam groups and to transmit the at least two laser beam groups to the holographic reflective optical fusion device, each of the at least two laser beam groups corresponds to a displayed image,
wherein the holographic reflective optical fusion device is configured to reflect the at least two laser beam groups to perform imaging on a human eye based on displayed images of at least two focal planes of the at least two laser beam groups, and
wherein the laser projection optical engine comprises a laser generator to generate the at least two laser beam groups, wherein a preset wavelength difference exists between a $j^{th}$ laser beam in an $i^{th}$ laser beam group and a $j^{th}$ laser beam in a $k^{th}$ laser beam group, and i, j, and k are integers greater than or equal to 1.

2. The system according to claim 1, wherein the laser projection optical engine further comprises:
a scanning modulator to modulate the at least two laser beam groups, so that laser beams in the laser beam groups are emitted to the holographic reflective optical fusion device at different deflection angles.

3. The system according to claim 2, wherein a divergence angle of the $j^{th}$ laser beam in the $i^{th}$ laser beam group is equal to a divergence angle of the $j^{th}$ laser beam in the $k^{th}$ laser beam group, and a quantity of laser beams in the $i^{th}$ laser beam group is less than or equal to a quantity of laser beams in the $k^{th}$ laser beam group.

4. The system according to claim 2, wherein the holographic reflective optical fusion device comprises at least two holographic function layers, each holographic function layer is configured to reflect one of the at least two laser beam groups, and different holographic function layers reflect different laser beam groups.

5. The system according to claim 2, wherein the laser beam group comprises at least one laser beam, and wavelengths of all laser beams comprised in any laser beam group are different from wavelengths of laser beams comprised in another laser beam group.

6. The system according to claim 2, wherein a wavelength difference between every two laser beams of all the laser beams is greater than a sensitive wavelength difference of the holographic reflective optical fusion device.

7. The system according to claim 2, wherein the laser generator comprises at least one laser chip, each laser chip is configured to generate laser beams of different wavelengths in a time division manner, and the at least one laser chip is configured to generate the at least two laser beam groups in a time division manner, wherein the laser beam groups comprise laser beams generated by all the laser chips at a same moment.

8. The system according to of claim 2, wherein the laser generator comprises at least two laser chipsets, each laser chipset comprises at least one laser chip, each laser chip is configured to generate a laser beam with one wavelength, and each laser chipset is configured to generate a laser beam group.

9. The system according to of claim 2, wherein the scanning modulator is a reflective scanning oscillator or an actuator.

10. The system according to claim 1, wherein the laser projection optical engine comprises:
a laser generator to generate the at least two laser beam groups; and
a scanning modulator to modulate the at least two laser beam groups, so that laser beams in the laser beam groups are emitted to the holographic reflective optical fusion device at different deflection angles, wherein
a wavelength of a $j^{th}$ laser beam in an $i^{th}$ laser beam group is the same as a wavelength of a $j^{th}$ laser beam in a $k^{th}$ laser beam group, wavelengths of laser beams in the laser beam group are different from each other, divergence angles of all laser beams with a same wavelength are different, focal planes of displayed images obtained after the laser beams with a same wavelength but different divergence angles are reflected by the holographic reflective optical fusion device and undergo imaging by a human eye are different, and i, j, and k are integers greater than or equal to 1.

11. The system according to claim 10, wherein a quantity of laser beams in the $i^{th}$ laser beam group is less than or equal to a quantity of laser beams in the $k^{th}$ laser beam group.

12. The system according to claim 10, wherein the laser generator comprises:
at least two laser chipsets, each laser chipset including at least one laser chip; and
a plurality of beam shaping components, each corresponding to one of the laser chips in the laser chipsets, wherein each laser chip is configured to generate a laser beam with one wavelength,
wherein each laser chipset is configured to generate a laser beam group, and a wavelength of a $j^{th}$ laser beam in the $i^{th}$ laser beam group is the same as a wavelength of a $j^{th}$ laser beam in the $k^{th}$ laser beam group, and
wherein each beam shaping component is configured to shape a laser beam generated by a corresponding laser chip, so that divergence angles of all laser beams with a same wavelength are different.

13. The system according to claim 10, wherein the laser generator comprises:
at least one laser chip to generate a laser beam; and
a zoom beam shaping component that is in a one-to-one correspondence with each laser chip, configured to shape, in a time division manner, a laser beam generated by a laser chip corresponding to the zoom beam shaping component into laser beams with at least two divergence angles, wherein the laser beam group comprises laser beams shaped by the zoom beam shaping component at a same moment.

14. The system according to claim 1, wherein the laser projection optical engine comprises:
a laser generator comprising at least one laser chip to generate at least one laser beam;
a scanning modulator to modulate the at least one laser beam, so that the at least one laser beam is emitted to the holographic reflective optical fusion device at different deflection angles; and
a zoom relay optical component to shape, in a time division manner, a same laser beam processed by the scanning modulator into laser beams with at least two divergence angles, and to transmit the laser beams with the at least two divergence angles to the holographic reflective optical fusion device, wherein the laser beam group comprises a laser beam shaped by the zoom relay optical component at a same moment; and
focal planes of displayed images obtained after laser beams with a same wavelength but different divergence angles are reflected by the holographic reflective optical fusion device and undergo imaging by a human eye are different.

15. The system according to claim 1, further comprising:
a display controller to send configuration information to the laser projection optical engine, wherein the configuration information used by the laser projection optical engine to modulate at least two displayed images.

16. The system according to claim 15, further comprising:
an eyeball tracking device to determine a gaze direction of a user, wherein
the display controller is configured to
generate the configuration information based on the gaze direction, and
send the configuration information to the laser projection optical engine, wherein the configuration information is used by the laser projection optical engine to modulate the at least two displayed images, and a focus of each displayed image matches the gaze direction.

17. An augmented reality device, comprising:
a carrier; and
a multi—focal plane display system disposed on the carrier, the multi—focal plane display system comprising:
a holographic reflective optical fusion device; and
a laser projection optical engine to generate and modulate at least two laser beam groups and to transmit the at least two laser beam groups to the holographic reflective optical fusion device, each of the at least two laser beam groups corresponds to a displayed image,
wherein the holographic reflective optical fusion device is configured to reflect the at least two laser beam groups to perform imaging on a human eye based on displayed images of at least two focal planes of the at least two laser beam groups, and wherein the laser projection optical engine comprises a laser generator to generate the at least two laser beam groups, wherein a preset wavelength difference exists between a $j^{th}$ laser beam in an $i^{th}$ laser beam group and a $j^{th}$ laser beam in a $k^{th}$ laser beam group, and i, j, and k are integers greater than or equal to 1.

18. The device according to claim 17, wherein the augmented reality device is augmented reality glasses;

the carrier comprises a lens frame and a lens;

the laser projection optical engine is disposed in the lens frame; and the holographic reflective optical fusion device is disposed on the lens.

19. A virtual reality device, comprising:

a carrier; and a multi—focal plane display system disposed on the carrier, the multi—focal plane display system comprising:

a holographic reflective optical fusion device; and a laser projection optical engine to generate and modulate at least two laser beam groups and to transmit the at least two laser beam groups to the holographic reflective optical fusion device, each of the at least two laser beam groups corresponds to a displayed image, wherein the holographic reflective optical fusion device is configured to reflect the at least two laser beam groups to perform imaging on a human eye based on displayed images of at least two focal planes of the at least two laser beam groups, and wherein the laser projection optical engine comprises a laser generator to generate the at least two laser beam groups, wherein a preset wavelength difference exists between a $j^{th}$ laser beam in an $i^{th}$ laser beam group and a $j^{th}$ laser beam in a $k^{th}$ laser beam group, and i, j, and k are integers greater than or equal to 1.

20. The device according to claim 19, wherein the virtual reality device is virtual reality glasses;

the carrier comprises a lens frame and a lens;

the laser projection optical engine is disposed in the lens frame; and the holographic reflective optical fusion device is disposed on the lens.

* * * * *